(12) United States Patent
Ady et al.

(10) Patent No.: US 7,904,277 B2
(45) Date of Patent: Mar. 8, 2011

(54) LABELING METHODS AND DEVICES

(75) Inventors: Roger Ady, Chicago, IL (US); Leon Fitzpatrick, Chicago, IL (US); Richard Schatzberger, Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 180 days.

(21) Appl. No.: 11/954,787

(22) Filed: Dec. 12, 2007

(65) Prior Publication Data

US 2009/0157354 A1    Jun. 18, 2009

(51) Int. Cl.
*G06F 19/00* (2006.01)

(52) U.S. Cl. ........... 702/183; 345/107; 345/2.3; 345/1.3; 345/55; 370/406; 340/5.91; 705/67; 705/75

(58) Field of Classification Search .................. 702/183; 345/59, 107, 85, 87, 1.1, 1.3, 2.1, 2.3, 55; 370/406; 340/825.49, 5.91, 5.92, 572.1; 705/67, 75

See application file for complete search history.

(56) References Cited

U.S. PATENT DOCUMENTS

| | | | | |
|---|---|---|---|---|
| 6,118,426 A * | 9/2000 | Albert et al. | ................. | 345/107 |
| 6,252,564 B1 * | 6/2001 | Albert et al. | ................. | 345/1.3 |
| 6,459,418 B1 * | 10/2002 | Comiskey et al. | ............ | 345/107 |
| 6,639,578 B1 * | 10/2003 | Comiskey et al. | ............ | 345/107 |
| 6,753,830 B2 * | 6/2004 | Gelbman | ........................ | 345/55 |
| 6,885,032 B2 | 4/2005 | Forbes et al. | | |
| 6,924,781 B1 * | 8/2005 | Gelbman | ........................ | 345/85 |
| 7,040,536 B2 | 5/2006 | Rosenfeld | | |
| 2001/0020935 A1 * | 9/2001 | Gelbman | ...................... | 345/173 |
| 2002/0167500 A1 * | 11/2002 | Gelbman | ...................... | 345/204 |
| 2004/0119681 A1 * | 6/2004 | Albert et al. | .................. | 345/107 |
| 2005/0209980 A1 | 9/2005 | Ishii et al. | | |
| 2007/0024551 A1 * | 2/2007 | Gelbman | ........................ | 345/85 |
| 2007/0285385 A1 * | 12/2007 | Albert et al. | .................. | 345/107 |
| 2008/0157925 A1 * | 7/2008 | Batra | .......................... | 340/10.1 |

FOREIGN PATENT DOCUMENTS

| | | |
|---|---|---|
| JP | 2002297809 A | 10/2002 |
| KR | 1020030081743 A | 10/2003 |
| KR | 1020050019216 A | 3/2005 |
| KR | 1020070016499 A | 2/2007 |
| WO | 0156029 A1 | 8/2001 |

\* cited by examiner

*Primary Examiner* — Carol S Tsai

(74) *Attorney, Agent, or Firm* — Paula N. Chavez; Sylvia Chen

(57) ABSTRACT

Disclosed are methods and electronic devices 102 including a display 104 that is configured to display indicia 114, 116, 118 persistently during a shipping process. The disclosed methods and electronic devices may include an indicia control 110 for dynamically determining the indicia for persistent display based on at least one of a self-diagnostic software tool 112, a selection from a table 122 of predetermined information, or downloaded data 124. In one embodiment, by self-diagnosing a condition in the device 102, repair or other similar indicia may be determined dynamically based on the self-diagnosis, and displayed persistently on the display 104 during a shipping process. In another embodiment, the persistent labeling indicia may include destination information 116 for routing based on the self-diagnosis. In yet another embodiment, product recycling indicia may be persistently displayed when the age of the device is determined in accordance with a self-diagnostic software tool 112.

20 Claims, 3 Drawing Sheets

LABELING METHODS AND DEVICES

FIELD

Disclosed are methods and devices for self-diagnosing and displaying indicia for transport of a device to a geographic destination.

BACKGROUND

Electronic devices, and in particular those including a display such as mobile communication devices, are routinely transported or shipped for different purposes. For example, in the event that there is a service issue with the product, the product may be transported or shipped to a repair center. In another example, in a product "take-back" program where products are recycled, the product may be shipped for refurbishment and forwarded to a retail facility or directly to a subsequent end-user. In yet another example, a product may be routed within a facility (such as a manufacturing plant) for different processes during its assembly.

For transport, destination information is commonly printed on a shipping label affixed to an envelope (or package) containing a device. In another example, repair and diagnosis indicia may printed on a label and affixed to an envelope for the product, or printed on a separate paper and inserted into the envelope with the product. It is possible that the device may become separated from its transport instructions. It is also possible that repair instructions could become lost.

Packaging a device for transport is labor intensive. Additionally, printing information about the device for packaging purposes usually requires pertinent data to be prepared by the user. When a repair or device recycle is required, a consumer may need to contact a manufacturer representative and receive specifically-prepared packing materials by mail or courier. In fact, mailing labels and other instructions may be specifically prepared for a particular consumer. A questionnaire about the product may need to be completed by the consumer prior to shipping the product. Such packaging, labeling, and/or instruction infrastructure may be required to ensure that the device and instructions are properly received at its destination. Any error, for example, by mislabeling, or loss of printed information may delay or inhibit proper routing and/or action with respect to the product.

DETAILED DESCRIPTION

Disclosed are methods and electronic devices including a display that is configured to show indicia persistently during a shipping process. The persistent indicia can be shown on the display in the absence of a voltage or with a very low voltage (e.g., with a main battery removed). Moreover, the disclosed methods and electronic devices may include an indicia control for dynamically determining the indicia for persistent display based on at least one of a self-diagnostic software tool, a selection from a table of predetermined information, or downloaded data.

In one embodiment, by self-diagnosing a condition in the device, appropriate repair or other similar indicia may be determined dynamically based on the self-diagnosis, and shown persistently on the display of the device during not only a shipping process but also during an internal routing process at a repair/refurbishment facility. In another embodiment, the persistent labeling indicia may include destination information for routing based on the self-diagnosis. In yet another embodiment, product recycling indicia may be persistently displayed when the age of the device is determined in accordance with a self-diagnostic software tool. By generating indicia that is persistently displayed, the previously-described packaging, labeling, and/or instruction infrastructure may be unnecessary. Moreover, persistently showing indicia on a device's own display reduces error (for example, by mislabeling or loss of printed information) that may delay or inhibit proper routing and/or action with respect to the product.

Figure 1:
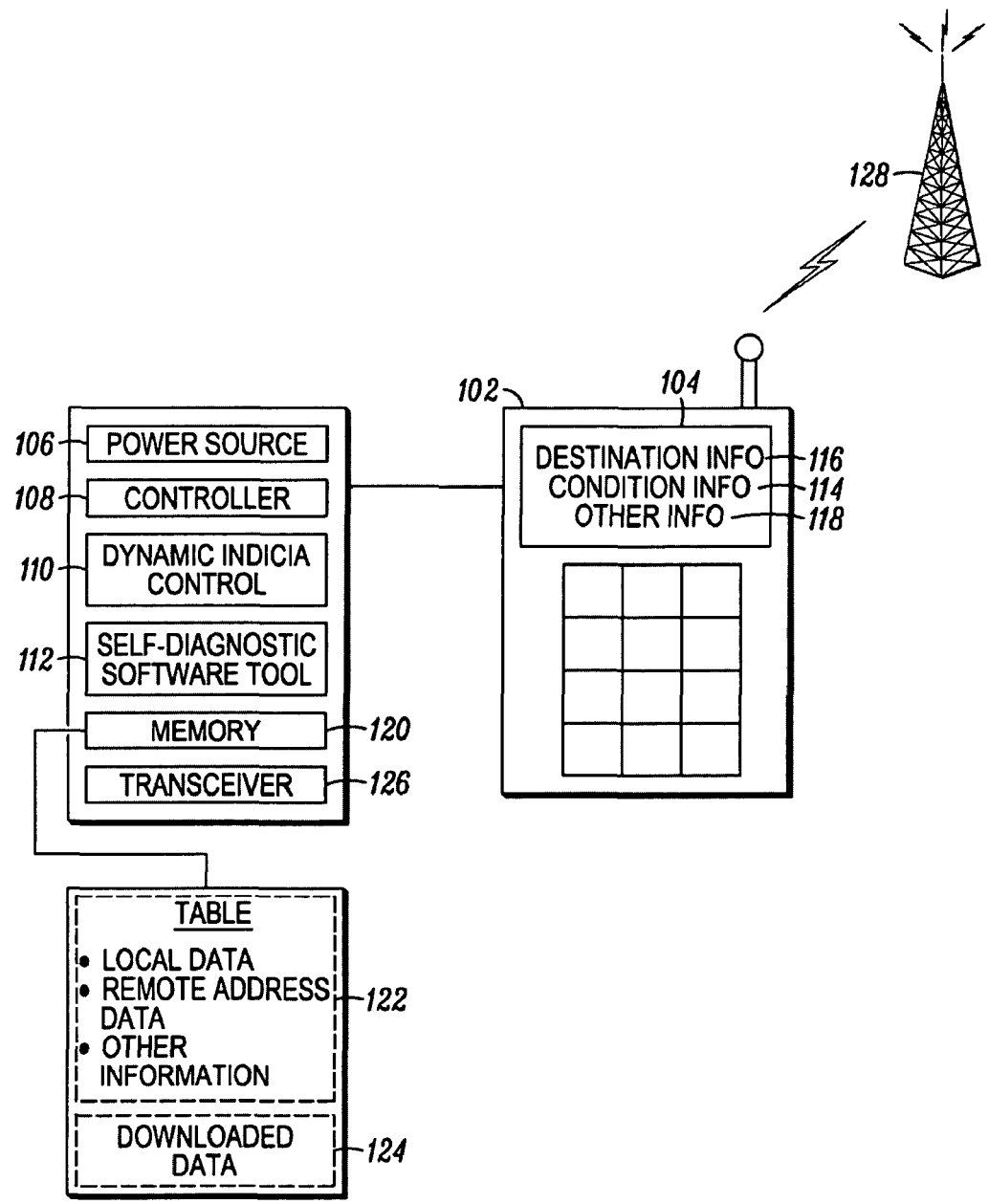
FIG. 1 depicts an electronic device, for example, a mobile communication device, including a display capable of persistent images, for example, in the absence of a voltage.

FIG. 1 depicts an electronic device, in this example a mobile communication device, including a display capable of persistent images, for example, in the absence of a voltage. In one embodiment of the electronic device 102, a primary display 104 may be of a type including a bi-stable (i.e., persistent) electrophoretic type of display which is capable of persistently displaying indicia after the power source 106 of the device 102 has been disconnected from the display 104. In such a state, there may be an absence of a voltage applied to the display 104, or in the alternative, a substantially reduced voltage. It is understood that any type of display capable of persistent images is within the scope of this discussion. Accordingly, once shown on the display of a device, indicia may persist through environmental stress and/or a substantial or total loss of power.

The electronic device 102 may be of any type including at least one display 104. The depicted mobile communication device may be may be implemented as a cellular telephone (also called a mobile phone). The depicted mobile communication device 102 represents a wide variety of devices that have been developed for use within various communication networks. Such handheld communication devices include, for example, cellular telephones, messaging devices, personal digital assistants (PDAs), notebook or laptop computers, mobile data terminals, application specific gaming devices, video gaming devices, and the like. Any of these portable devices may be referred to as a mobile station or user equipment.

While depicted as a mobile communication device 102 in this embodiment, the device 102 could be any type of electronic device that includes a display 104. For example, the device 102 could alternatively be implemented as a set-top box, digital audio equipment, and a digital camera. While depicted as a primary display, the display 104 may be any size, including a small display of any size and dimensions.

The described electronic device 102 includes a controller 108 coupled to the display 104. An indicia control 110 is coupled to the controller 108 for dynamically determining the indicia for persistent display based on, for example, a self-diagnostic software tool 112. The device 102 may perform a self-diagnosis and persistently display self-diagnosis results or repair indicia on its display 104 so that when received for repairs, at for example a repair facility, the repair or condition information 114 could be easily visually accessible and/or readable. The condition information 114 may be displayed in any manner. For example, the condition information 114 may be displayed as a bar code, English text, or alphanumeric codes.

Condition information 114, and other indicia, may be displayed using non-textural indicators. For example, a series of dots, such as five dots, may be used as indicia. In this example, depending upon which dots are turned on and which are turned off, condition information 114 indicates a particular self-diagnosis result. It is understood that there are a number of manners in which to display indicia, including a segmented electrophoretic display, or an ancillary or secondary display separate from the device's main or primary display. Additionally, color coding may be used as indicia to indicate condition information 114 and/or routing information 116.

Condition (or repair) information 114 and destination (or routing) information 116 can be simultaneously and persistently displayed so that both routing and the condition of the device could be easily visually accessible as depicted and described with reference to FIG. 3 below. Alternatively, only one type of information (either condition or destination) can be shown. It is understood that any other type of information 118 may be displayed in addition to those discussed above, or in the alternative, instead of either one (or both) of those previously described. For example, a product number, a Return Merchandise Authorization (RMA) number, or other indicia associated with the device 102 may be displayed.

The indicia control 110 and the self-diagnostic software tool 112 can be in hardware and/or software. The software can be in the form of an indicia control module and a self-diagnostic software tool module that carry out certain processes of the methods as described herein. As mentioned, modules can be implemented in software, such as in the form of one or more sets of prestored instructions, and/or hardware, which can facilitate the operation of the electronic device as discussed below. The modules may be installed at the factory or can be installed after distribution by, for example, a downloading operation.

In addition to (or alternative to) self-diagnosis indicia 114, the dynamic indicia control 110 may dynamically determine the indicia for persistent display based on information stored in memory 120 such as a selection from a table of pre-determined information 122, and/or downloaded data 124. For example, shipping information and postal payment may be extracted by algorithms from local data or from live databases accessed from a wired or wireless network server. For instance, depending upon the service issue, the reason for return, and/or the present location of the device, the appropriate return address can be accessed from a table stored locally in the device or can be downloaded. Additional intelligence or routing information that the device may provide can improve efficiency of the transport process and may provide for reduced shipping costs by insuring that the device is sent to the nearest capable center for the action required based on, for example, real-time GPS data of the device 102 location. The device 102 shown includes at least one transceiver 126 that may communicate with a compatible communication device such as a remote server through a base station or access point 128.

The server is assumed to be a remote server within a wireless or wired communication network. The network, of course, may be any type of wireless or wired network including an ad hoc or wireless personal area network, a WiFi or wireless local area network, and a cellular or wireless wide area network. The server may be implemented as a single server or as a plurality of servers in communication in any arrangement and the operations of the server may be distributed. It is understood that the depiction in FIG. 1 is for illustrative purposes.

Figure 2:
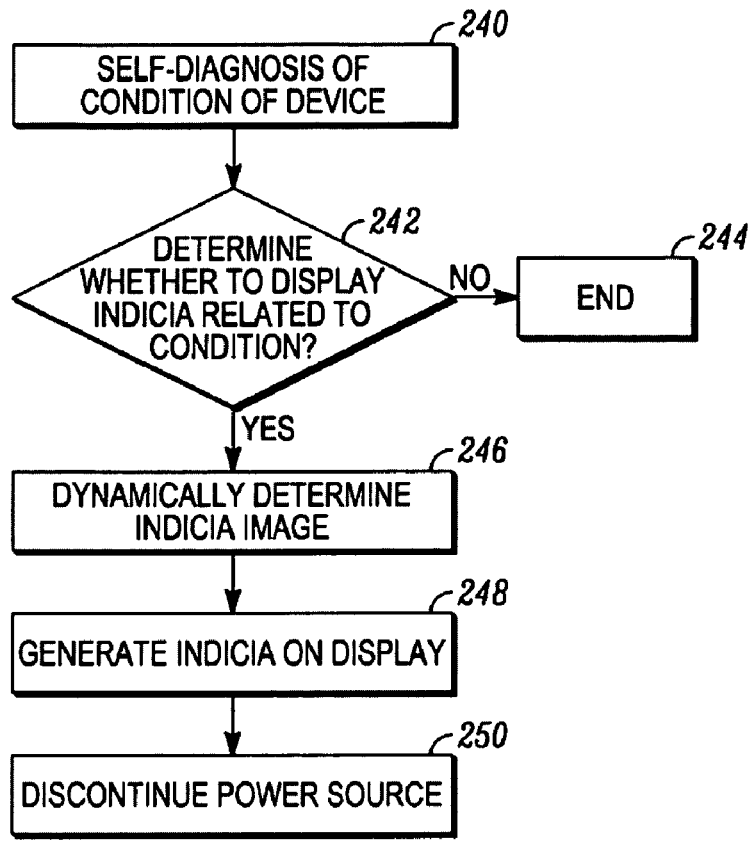
FIG. 2 is a flowchart illustrating a method of the described electronic device including self-diagnosing a condition of the device, dynamically determining indicia for persistent display based on the self-diagnosis to generate self-diagnostic indicia, and displaying the self-diagnostic indicia persistently during a shipping process.

FIG. 2 is a flowchart illustrating a method of the described electronic device including self-diagnosing a condition of the device, dynamically determining indicia for persistent display based on the self-diagnosis to generate self-diagnostic indicia, and displaying the self-diagnostic indicia persistently during a shipping process from the point of preparing the electronic device for shipping to the point of arrival at its destination. Self-diagnosing 240 the condition of the device may be, for example, as simple as determining the age of the device. There may be an age timer to provide an indication of the age of the device, for example, for the purpose of recycling the device which is discussed in more detail below in reference to FIG. 4. Other self-diagnosed conditions may include, for example, that the product is suffering from short battery life. Self-diagnosed conditions may in addition include any condition that may be detected by, for example, a software or hardware system check module that is responsive, for example, to predetermined criteria. In this way, self-diagnosing may occur without user interaction. On the other hand, in addition, or in the alternative, self-diagnosing may include user interaction, for example, by the user filling out a questionnaire or user survey form for receipt of user input. It is understood that any manner in which self-diagnosing of conditions in the device or product is within the scope of this disclosure.

Determining 242 whether to display indicia related to the condition of the device may result in an end to the process 244 if the device determines no need to display indicia related to the self-diagnosis. For example, a self-diagnosis may reveal no problems or abnormal conditions with the device 102 (see FIG. 1). In some devices, a self-diagnosis may be routine. A self-diagnosis may result in positively determining 242 to display indicia related to the condition of the device. The condition may be for example, the need for repair, or (as mentioned above) that the device has reached a certain age so that it is ready to be recycled. The dynamic indicia control 110 may therefore dynamically determine 246 indicia for persistent display based on the self-diagnosis to indicate condition information 114.

To generate 248 an indicia signal so that indicia may be on the display 104 (see FIGS. 1 and 304 of FIG. 3), data may be accessed from a memory 120 that may include, for example, a table 122. The table 122 may include codes to generate indicia based on the self-diagnosed condition of the device 102. The table 122 may also include remote address data such as a telephone number or web site address so that the device 102 may communicate with a remote server. Downloaded data 124 from the server may be stored in memory 120 as well.

As discussed above, it is understood that any manner in which to persistently display indicia that is an image on an electronic display is within the scope of this discussion. In the case where showing indicia on the display 104 (see FIG. 1) persistently during a shipping process may be performed in the absence of a voltage, for example, by an electrophoretic display, the above described method may include discontinuing 250 a power source to the display 104. It is understood that that other types of displays that can retain an image for a long, time may be used. For example a super twisted nematic (STN) liquid crystal display (LCD) without a backlight requires little power to maintain an image. As another example, a cholesteric liquid crystal display (ChLCD) is bistable and does not require power to retain an image. In some embodiments, the user may be instructed to remove a power source 106 (FIG. 1) from the electronic device. Note that temperature extremes may severely diminish the usage capacity of certain types of battery cells, so that even if the battery remains in the electronic device, the battery will longer be producing usable power. As mentioned above, any manner in which to persistently display indicia that is dynamically determined is within the scope of this discussion.

Figure 3:
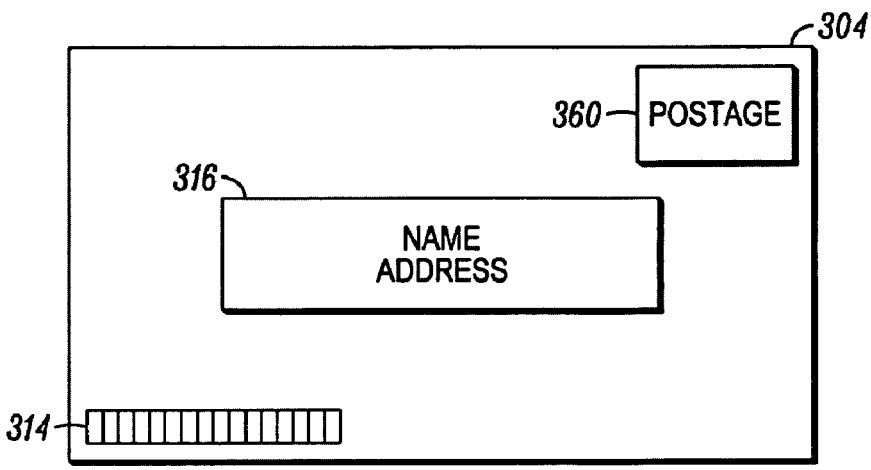
FIG. 3 depicts a persistent display including certain indicia such as postage indicia, destination indicia, and a bar code indicating condition indicia.

FIG. 3 depicts a persistent display 304 including certain indicia such as postage indicia 360, destination indicia 316, and a bar code indicating condition indicia 314. The postage indicia 360 may be prepaid and provided by a commercial postage service. As discussed above, the dynamic indicia control 110 (see FIG. 1) coupled to the controller 108 may dynamically determine the indicia for persistent display on the display 304 based on at least one of a self-diagnostic software tool 112, a selection from a table of pre-determined information 122, or downloaded data 124.

Figure 4:
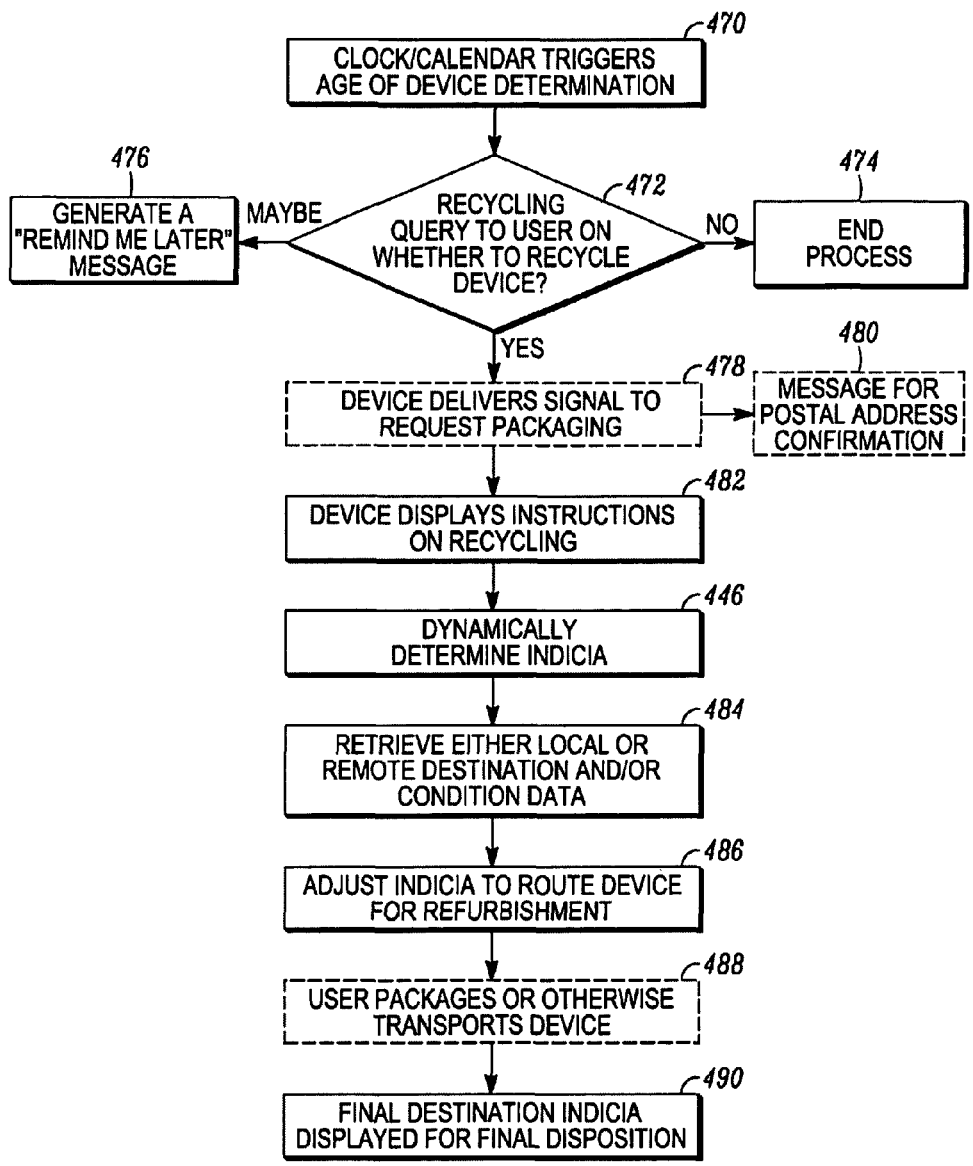
FIG. 4 is a flowchart illustrating a self-diagnostic method and a device recycling process by which persistent indicia may be generated based on the self-diagnostic software tool.

FIG. 4 is a flowchart illustrating a self-diagnostic method and a device recycling process by which persistent indicia may be generated based on the self-diagnostic software tool 112 (see FIG. 1). In a recycling embodiment of the described method, a device 102 may include a self-diagnostic indicator such as a clock or calendar to trigger a determination 470 of the age of the device 102. As mentioned above, in a product recycling program, or an otherwise routine service requirement, the age of the device may be determined 470 by the self-diagnostic software tool 112.

The user may determine, based on a recycling query 472, if the user wishes to proceed with the recycling of the device. If the answer to the recycling query 472 is no, then the process ends 474. The answer to the recycling query may also be to generate 476 a "remind me later" message, in which case, for example, the clock/calendar may be reset to a different date.

In the event that the user answers affirmatively the recycling query 472, the device may transmit 478 (either automatically or with a prompt) a signal to a telephone number or Internet address requesting a packaging envelope if needed or desired. A message may be returned 480 requesting postal address confirmation (of the user's address originally provided when purchasing the device) which a user may provide. In the alternative, a package may be included with the product at the time of purchase.

Packaging delivery may be optional. For example, the user may instead take the device 102 (see FIG. 1) to a retail or other type of outlet. In another example, a courier may pick up the device 102. In any case, the device 102 may display instructions 482 for recycling the device 102. In addition to the display of instructions 482, a request for a Return Merchandise Authorization (RMA) may trigger a user survey, the results of which can be used to determine the optimal location to send the device for recycling, repair, return, or any other corrective action.

Based on the self-diagnosis of the age of the device 102 (see FIG. 1), the method includes dynamically determining 446 indicia for persistent display based on the self-diagnosis 470. Data for the indicia may be retrieved 484 locally from memory 120 (for example in a table 122) or remotely and downloaded to memory 120. The indicia may therefore be adjusted 486, for example, to include a postal address or other address, postage if necessary, and/or a bar code or alphanumeric codes, to route the device for refurbishment or to another location. For example, a persistent display may include indicia such as that depicted on display 304 (see FIG. 3) as described above. The user may package 488 or otherwise transport the device 102 (see FIG. 1). In this way, the final destination may be persistently displayed 490 for final disposition of the device. The device may be placed in packaging materials as described above. In an embodiment, the packaging materials may include a clear envelope through which the indicia shown on the persistent display of the device may be readily seen. In another embodiment, the packaging materials may include an envelope that may be otherwise opaque or translucent except for a clear window for visibility of the persistently displayed indicia. Were the device to be separated from the packaging, the device could still be properly delivered. In another embodiment, after the time period has expired 470, the device's display 104 (see FIG. 1) may access the recycling beneficiary's shipping information, and then lock the display 104. When the device 102 reaches its new destination, the device 102 may be reactivated and the device's display 104 unlocked.

The above-described method of FIG. 4 may further provide a cost reduction benefit. As mentioned-above, based on the self-diagnosis, shipping information and postal payment information can be extracted by algorithms from internal data storage or from live databases accessed from a remote server. By insuring that the device is sent to the nearest capable center for the action required (for example, based on real-time GPS data of the device 102 location, additional intelligence, or routing information) the device can improve efficiency of the transport process and may reduce shipping costs. Accordingly, the previously-described packaging, labeling, and/or instruction infrastructure for preparing printed labels or other printed materials for transport may be unnecessary.

Disclosed above are methods and electronic devices in which the display of an electronic device can show indicia, such as transport information and/or other indicia persistently, particularly when the device is transported, for example, for repairs, returns, and recycling. A device may in addition be transported within a facility, such as an assembly plant, based on the persistent indicia. In this way, the display itself can act as a label, such as a mailing label including a destination designation and other information. In this way, the need to print a label for routing may be eliminated. Moreover, the disclosed devices may be configured to provide a self-diagnosis and may be configured to persistently display self-diagnosis or condition indicia on the device's display, so that when received for repairs, the condition data could be easily visually accessible. In this manner, packaging and preparation for shipping may be streamlined.

The above-disclosed methods and electronic devices include a display that is configured to display indicia persistently during a shipping process. Moreover, the disclosed methods and electronic devices may include an indicia control for dynamically determining the indicia for persistent display based on at least one of a self-diagnostic software tool, a selection from a table of pre-determined information, or downloaded data. Accordingly, condition and/or routing data may be simultaneously and persistently displayed, avoiding the necessity for an infrastructure for packaging as described above for transport for example for returns, repairs, and recycling. Moreover, since indicia is persistently displayed on a device's own display, error, for example, by mislabeling, or loss of printed information that may delay or inhibit proper routing and/or action with respect to the product may be avoided.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, rotating and stationary, and the like are used solely to distinguish one from another entity or action without necessarily requiring or implying any actual such relationship or order between such entities or actions.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. A method of an electronic device having a controller and a display coupled to the controller, the method comprising:
    self-diagnosing a condition in the electronic device, wherein the condition is that the electronic device needs repair or that the electronic device has reached a predetermined age;
    dynamically determining, by the electronic device, destination information for routing based on the self-diagnosed condition in the electronic device; and
    showing persistent indicia on the display persistently during an entire shipping process, the persistent indicia including the determined destination information for routing.

2. The method of claim 1, wherein self-diagnosing comprises:
    self-diagnosing non-interactively based upon predetermined criteria.

3. The method of claim 1, wherein self-diagnosing comprises:
    self-diagnosing interactively via receipt of user input.

4. The method of claim 1 wherein showing persistent indicia on the display persistently during an entire shipping process is in an absence of an applied voltage.

5. The method of claim 4 wherein showing persistent indicia on the display persistently during an entire shipping process is in an absence of a main battery.

6. The method of claim 1, wherein showing persistent indicia on the display comprises displaying an address label.

7. The method of claim 1, wherein showing persistent indicia on the display comprises displaying a bar code.

8. The method of claim 1, the method further comprising:
    downloading remote data from a server; and
    determining the persistent indicia based on the remote data.

9. The method of claim 1, the electronic device further having a memory, the method further comprising:
    retrieving local data from the memory; and
    displaying the persistent indicia based on the local data.

10. A method of an electronic device including a controller and a display coupled to the controller, the method comprising:
    self-diagnosing a condition of the electronic device, wherein the condition is that the electronic device needs repair or that the electronic device has reached a predetermined age;
    dynamically determining, by the electronic device, destination information for routing based on the self-diagnosed condition to generate self-diagnostic indicia; and
    displaying the self-diagnostic indicia persistently throughout a shipping process.

11. The method of claim 10, wherein displaying the self-diagnostic indicia persistently throughout a shipping process is in an absence of an applied voltage.

12. The method of claim 10, wherein dynamically determining comprises:
    downloading remote data from a server; and
    determining the self-diagnostic indicia based on the remote data.

13. The method of claim 10, the electronic device further having a memory, wherein dynamically determining comprises:
    retrieving local data from the memory; and
    determining the self-diagnostic indicia based on the local data.

14. An electronic device, comprising:
    a controller;
    a display coupled to the controller, wherein the display is configured to display indicia persistently during a shipping process; and
    a dynamic indicia control coupled to the controller for determining destination information for routing based on a self-diagnostic software tool that determines whether the electronic device needs repair or has reached a predetermined age.

15. The electronic device of claim 14, wherein the display is configured to display the indicia persistently during a shipping process in an absence of an applied voltage.

16. The electronic device of claim 14, wherein the indicia comprises:
    a bar code.

17. The electronic device of claim 14, wherein the dynamic indicia control triggers generation of destination indicia.

18. The electronic device of claim 17, wherein the destination indicia comprises:
    postal address indicia.

19. The electronic device of claim 17, wherein the destination indicia comprises:
    postage indicia.

20. The electronic device of claim 14, wherein the display is an electrophoretic (E-ink) type display.

* * * * *